METHOD FOR PRODUCING MAGNETIC RECORD MEMBERS

Filed March 24, 1958 2 Sheets-Sheet 1

Inventor
Marvin Camras by Hill, Sherman, Meroni, Gross & Simpson Attys

Aug. 29, 1961 M. CAMRAS 2,998,325

METHOD FOR PRODUCING MAGNETIC RECORD MEMBERS

Filed March 24, 1958 2 Sheets-Sheet 2

Inventor
Marvin Camras by Hill, Sherman, Meroni, Gross & Simpson Attys

United States Patent Office 2,998,325

Patented Aug. 29, 1961

2,998,325

METHOD FOR PRODUCING MAGNETIC RECORD MEMBERS

Marvin Camras, Glencoe, Ill., assignor to Armour Research Foundation of Illinois Institute of Technology, Chicago, Ill., a corporation of Illinois Filed Mar. 24, 1958, Ser. No. 723,451

3 Claims. (Cl. 117—64)

This invention relates to a method for treating a magnetic record member and particularly to a method and means for smoothing the active surface thereof.

As the information density to be recorded on a magnetic record member is increased, a number of problems are encountered in present day magnetic recording. One of the most important is the maintaining of adequate contact between the record member active surface and the head. Another is the relatively high noise level that occurs at short wavelengths. Both problems are caused in great measure by lack of adequate stable coupling between the head and record member due to roughness of the record member active surface.

For recording in the megacycle range an increase in information density allows a reduction in the high record member speeds now required. At normal speeds and at extra low speeds an equivalent saving also takes place.

Accordingly, it is an important object of the present invention to provide a novel method for treating magnetic record members to greatly improve the response characteristics thereof at high speeds.

Another object of the invention is to provide a novel method for greatly increasing the smoothness of the operative surfaces of magnetic record media.

Still another object of the invention is to provide a method for smoothing the operative surfaces of magnetic record media which is especially suitable where the active surface is of thermoplastic material.

A further object of the invention is to provide a method of smoothing tape surfaces which may be applied during the process of forming the magnetizable coating on the tape.

A feature of the invention resides in the provision of a very highly polished smooth surface which is maintained in conforming pressure contact with the tape surface without substantial relative motion therebetween to provide an extremely smooth active surface for magnetic record media.

A still further feature of the present invention is to provide a magnetic orienting field in a new and advantageous direction and location, which acts to align the magnetic elements of the coating of a magnetic record medium.

Other objects, features and advantages of the present invention will be apparent from the following detailed description, taken in connection with the accompanying drawings, in which.

Figure 2:
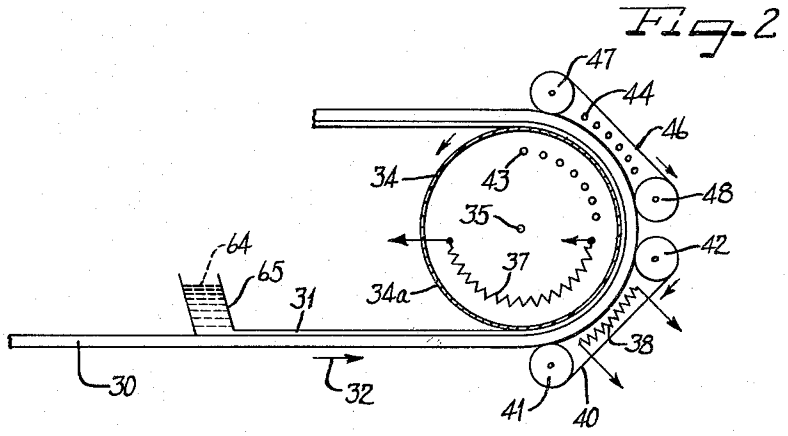
FIGURE 2 illustrates a further embodiment wherein the record medium is progressively moved into contact with a smoothing surface.
Figure 2B:
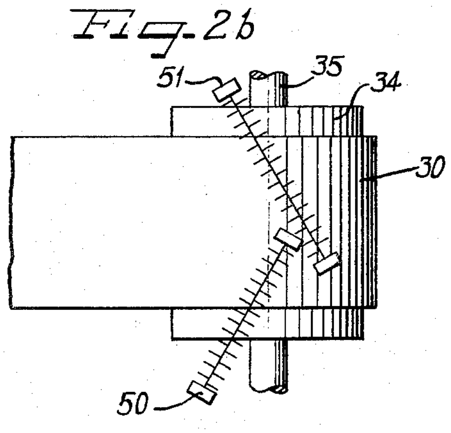
Figure 2A:
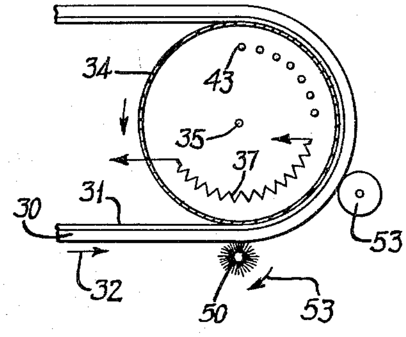
Figure 3:
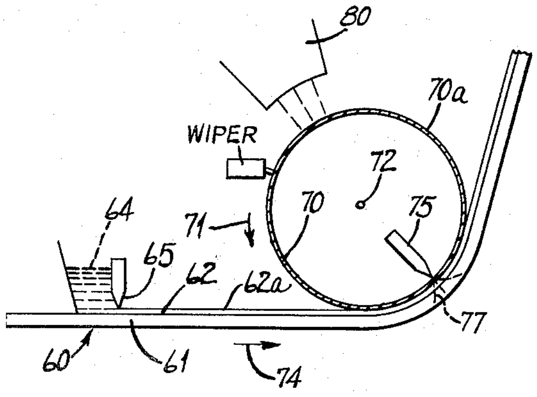
Figure 3A:
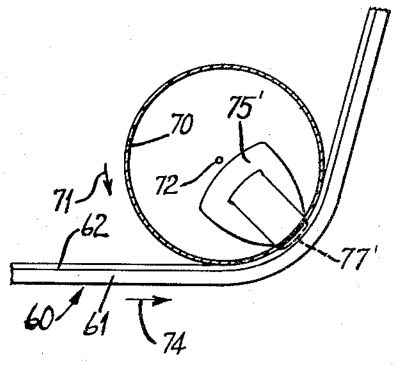
Figures 4, 5:
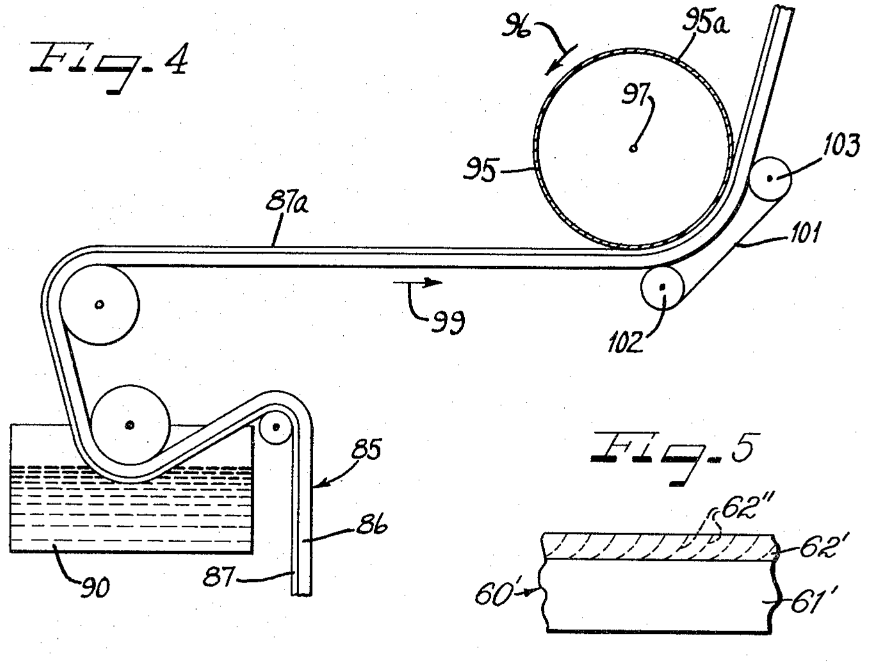

FIGURE 2*a* illustrates a modification of the embodiment of FIGURE 2 wherein revolving brushes are utilized to iron out the tape against the smoothing roll;

FIGURE 2*b* illustrates the configuration of the revolving brushes of FIGURE 2*a* in bottom plan;

FIGURE 3 ilustrates another configuration for progressively smoothing a surface of a magnetic record medium;

FIGURE 3*a* illustrates a modification of the embodiment of FIGURE 3 wherein a longitudinal gap permanent magnet is utilized to orient the particles of the magnetizable layer of the record medium travelling over the smoothing drum;

FIGURE 4 illustrates a fourth embodiment wherein the magnetizable coating is placed in a fluid condition by means of a suitable solvent and then passed into pressure contact with a smoothing surface; and FIGURE 5 is an enlarged side elevational view of a section of tape produced with the system of FIGURE 3, diagrammatically showing the predominant orientation of the magnetic element of the tape.

Figure 1:
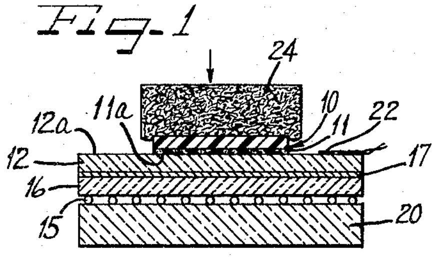
FIGURE 1 illustrates a first embodiment wherein the record member is heated while in contact with a smoothing surface.

As shown on the drawings:

FIGURE 1 illustrates a tape magnetic record member 10 which has an active magnetizable coating layer 11 with an active surface 11*a* disposed in contact with a very smooth flat planar surface 12*a* of a plate 12, which is substantially smoother than the tape active surface and may for example be plate glass. This method is particularly desirable for use with magnetic discs, sheets and other flat record members of extended area.

Suitable means may be provided for heating surface 12*a* and the active tape surface 11*a* to a temperature at which the tape surface 11*a* will be in a plastic condition. By way of example, a suitable electrical heating element 15 is indicated which is distributed over the area of the plate 12 and separated therefrom by means of an asbestos or fiberglass layer 16 and an aluminum sheet 17, which may for example have a thickness of 1/16 inch. The heat conductive sheet 17 has the function of distributing heat over the entire undersurface of the plate 12 for uniform heating of the surfaces 11*a* and 12*a*. The entire assembly may be supported on an asbestos board 20. The plate 12 may have a thickness of 1/4 inch.

By way of example, a tape was used which had a thermoplastic coating which softened in a certain temperature range, backed by a material having a considerably higher softening range.

Such a magnetic record tape may comprise a polyester ("Mylar") base 2 inches wide and .0005 inch thick primed with a thin coat (less than .0001 inch thick) of polyvinyl acetate of high molecular weight dissolved in acetone. The tape record member is formed by coating the primed base with a mixture containing 100 parts high coercive magnetic oxide such as disclosed in my U.S. Patent No. 2,694,656, issued November 16, 1954, or in my copending application Serial No. 114,677, filed September 8, 1949, and now abandoned, 74 parts polymerized acrylic ester resin solution (Acryloid B–72 manufactured by Rohm and Haas containing 40% solids and 60% toluene), milled with sufficient xylene to give proper coating viscosity (about 150 parts xylene were required for the coating apparatus used, but this may vary considerably). All of the above are parts by weight. The coating thickness after drying, totalled about 0.00025 inch. "Mylar" is a trade name for a polyester film of polyethylene terephthalate resin.

The dried coating on the base when surfaced against a heated plate glass surface as described herein receives a remarkably smooth mirror-like surface. Inspection of the tape surface with a 90 power binocular microscope showed it to be flat and glassy in comparison to its condition prior to treatment against the heated plate glass surface. By comparison, the smoothest prior art tapes appeared as "gravel" surfaces when magnified. By optical interference methods, it has been established that tape surfaces treated by the method described herein can be made optically flat and smooth.

By placing a thermocouple thermometer as indicated at 22 on the surface of the plate glass 12, it was found that the tape surface was smoothed into conforming relation to the plate surface 12*a* at temperature readings of the order of 160° F. to 250° F. In general, it was found that the smoothness of the tape surface increased with increasing temperature, the upper limit being determined by the necessity for avoiding damage to the tape base 10. Preferably the tape is pressed into contact with the heated surface 12*a*, as by means of a felt pressure device 24 acting on the inactive surface of the base 10 of the tape, the felt pad being moved back and forth to iron out the tape and to force out any air bubbles or blisters. It is considered that a temperature at the smoothing surface 12*a* of approximately 170° F. or greater is required for proper action. It has been found in some instances to be advantageous to cool the tape to room temperature before removing the same from the plate 12, although in most cases it may be stripped when only partially cooled, as long as the coating has hardened sufficiently.

In many cases it has been found that the smooth surface such as 12*a* can be maintained at constant temperature at which smoothing takes place when the coating is pressed against it, and the coating does not adhere to the surface enough to prevent stripping of the tape from the surface. This indicates that a constant temperature smoothing surface can be used.

On the other hand, the surface quality of the tape is generally better with a temperature somewhat higher than the constant temperature mentioned above, while stripping is easier at a somewhat lower temperature. A successful operation can thus take place with a smaller temperature differential than complete cooling (for example, cooling by an air stream may be sufficient). This allows more efficient operation in a simpler machine.

It was found that the actual surface temperature is somewhat higher than the nominal temperature indicated by the thermocouple, and also that optimum temperature depends on the thermoplastic properties of the tape layer. The backing of the magnetic layer must be chosen so that it will withstand the temperature at which the magnetic layer becomes mobile. Once the proper conditions have been determined, they can be repeated by setting to the same nominal temperature.

In some instances, it is desirable to coat the surface 12*a* with a suitable stripping material to prevent the active surface 11*a* from sticking thereto. An example of such a stripping material is silicone grease for example of the type sold as stopcock grease. A very thin layer thereof may be applied to either or both surfaces 11*a* and 12*a* if desired. One way of doing this is to apply a thick layer, and to wipe off the excess, leaving a high polish. The extremely thin coat that remains is sufficient. A suitable stripping material may also be applied to surfaces 11*a* and 12*a* by means of a spray or vapor, and the spreading and wiping steps may be carried on in a continuous process, for example with the use of the structures such as illustrated in FIGURES 2 and 3.

It is found that tape surfaces may be smoothed without the application of heat or with less heat if the surface 11*a* of the record member is first treated with a suitable solvent for placing the surface in a softened condition. As an example of a suitable solvent, a mixture of 21 cc. mineral spirits and 19 cc. amyl acetate is found to give a suitable softening action. Where the tape is dipped into the mixture, it is found that it need remain in the mixture for a period of less than 10 seconds to obtain the desired softening action. Toluene is another example of a suitable solvent. A mixture of mineral spirits and ethyl acetate is also suitable. In general the active solvent or softening agent is mixed with a diluent which slows or limits its action, so that the tape coating is not rendered too fluid. The best proportions for a particular type of coating are adjusted by trial.

In each case, the tape may be dipped into the solvent for a suitable length of time and then placed against the surface 12*a* of the plate 12, for example in the absence of heat, and allowed to remain on the surface until the solvent has evaporated. Preferably, the active surface 11*a* of the tape after softening by the solvent is pressed against the surface 12*a* with a positive pressure, for example by means of the pressure device 24.

FIGURE 2 illustrates a method for smoothing a tape surface wherein a record medium comprising a base 30 and an active magnetizable layer 31 is moved in the direction of an arrow 32 about a drum 34 mounted for rotation on an axis indicated at 35. The drum 34 may have a highly polished surface 34*a* which may be cylindrical, and has a surface finish of substantially optical precision. By way of example, the surface 34*a* may be formed by chromium plating of the drum 34 and then precisely lapping and polishing the surface. Preferably the drum surface 34*a* travels at the same speed as the surface of the tape 30 so that there is no relative movement therebetween as the tape travels over the drum.

As in the embodiment of FIGURE 1, suitable heating means may be provided to raise the temperature of the active surface 31 to the point where it will be sufficiently fluid to conform precisely to the surface 34*a* of the drum. Such heating means may comprise an electrical heating element 37 within the drum, or an electrical heating element 38 exterior to the drum. Preferably, a pressure belt 40 is provided running over idler rollers 41 and 42 and so arranged as to positively press the record member against the surface 34*a*. A series of rolls and/or pads may be used. The pressure is most effective near the end of the heating cycle, and should be sufficient to give practically perfect contact between tape and roll, removing bubbles and irregularities.

Preferably, suitable cooling means such as indicated at 43 or 44 are provided near the point where the tape 30 leaves the drum 34 so as to substantially cool the tape and set its coating layer before the tape is peeled from the drum surface 34*a*. A suitable pressure belt such as indicated at 46 running over idler rollers 47 and 48 may be provided at this location as indicated.

As illustrated in FIGURES 2*a* and 2*b*, a revolving brush or brushes such as indicated at 50 in FIGURE 2*a* and 50 and 51 in FIGURE 2*b* may be provided rotating in the direction indicated by arrow 53 in contact with the base 30 of the record member as it travels about the drum 34 to iron out the tape against the roll and to produce an extra smooth surface. A felt covered roll such as indicated at 53 may be provided for further smoothing action.

FIGURE 2*b* illustrates a pair of brushes 50 and 51 rotating at a surface speed faster than the surface speed of the tape so as to smooth the tape against the roll from the center outwards thus ironing out bubbles and the like. Most irregularities, bubbles and the like are best removed before the contacting surfaces are at the maximum temperature, since at maximum temperature there is a tendency for the surfaces to stick together. Final ironing action such as provided by the felt covered roll 53 may take place at the high temperature.

FIGURE 3 illustrates a further embodiment of the present invention wherein a tape record member 60 comprises a base 61 to which a magnetizable coating 62 is applied by means of a reservoir 64 having suitable means such as a doctor blade 65 for applying a thin uniform coating to the base 61. The reservoir 64 may contain a suitable fluid binder with magnetizable particles suspended therein, for example as disclosed in U.S. Patent No. 2,711,901. The tape 60 is led over a rotatable drum 70 rotating in the direction of the arrow 71 on an axis such as indicated at 72, preferably at the same surface speed as the tape 60, the tape travelling in the direction of the arrow 74 into peripheral contact with the drum. Equality of surface speed is insured if drum 72 acts as the positive drive for the tape, with the takeup mechanisms, etc. operating through a slip arrangement so as to maintain tension.

Preferably, the speed of the tape 60 is such that the surface 62*a* of the coating 62 is still in a fluid or relatively soft condition so as to conform to the highly polished surface 70*a* of the drum 70, which as in the embodiment of FIGURE 2 may be substantially optically cylindrical and may be formed by chromium plating and polishing.

The drum may be of non-magnetic material and may have a stationary permanent magnet or electromagnet as indicated at 75 mounted therein and disposed for establishing a magnetic field which orients the particles in a desired direction. In the embodiment of FIGURE 3 a knife edge on magnet 75 applies a generally perpendicular magnetic field 77 to correspondingly orient the magnetizable particles of the layer 62.

An orienting magnetic field applied by a magnet located over the exposed or working surface of the tape has the advantage of attracting the magnetic elements toward the stronger field at the magnet, thus concentrating and compacting the elements at the surface where they are most effective. In prior art devices the orienting magnet is opposite the exposed active surface of the tape and tends to pull the magnetic particles toward the base and away from the active surface. In the case of orienting with a longitudinal component of field, it will be noted in FIGURE 3*a* that curvature of the flux 77′ in the record member is concave toward the active surface thereof, and the oriented elements are aligned in this manner. This is advantageous because the recording fields are in the same general direction with respect to the active surface when the record member is subsequently used with a magnetic recording head. On the other hand, if the orienting magnet is on the backing side of the tape, its flux is convex toward the tape surface, and the orientation of the particles does not correspond with recording fields to which the record member is subjected after manufacture.

FIGURE 5 is an enlarged side elevational view of a section 60′ of the tape produced with the system of FIGURE 3 including a base 61′ to which the coating 62′ is applied. Dotted lines 62″ diagrammatically show the orientation of the magnetizable particles in the coating 62′.

Preferably, in order to reduce sticking between the drum which may be substantially at room temperature and the fluid surface coating 62*a*, a vapor of an anti-sticking material may be projected onto the drum surface from a suitable source 80 or it may be spread by a wiper. A suitable lubricant may also be applied to the drum for forming a lubricating coating on the tape as it leaves the smoothing surface 70*a*. As in the preceding embodiments, suitable pressure applying means such as belts or rolls may be utilized in the embodiment of FIGURE 3 to insure positive pressure contact between surface 62*a* of the tape and the surface 70*a* of the drum 70.

FIGURE 4 illustrates an embodiment wherein a tape record member 85 comprising a base 86 and a magnetizable coating layer 87 is drawn through a solvent applying station 90 for applying a softening solvent to the magnetizable layer surface 87*a* for placing the layer in flowable condition as it travels around the drum 95 which is mounted for rotation in the direction indicated by arrow 96 on an axis indicated at 97. As in the preceding embodiments, the drum 95 may have a surface 95*a* which is substantially optically cylindrical and extremely smooth for impressing a corresponding smoothness upon the surface 87*a* of the tape. As in the embodiments of FIGURES 2 and 3, the tape may be suitably driven in the direction of the arrow 99 by means engaging the tape after it has returned to its dried normal condition. Suitable pressure means such as belt 101 carried by rollers 102 and 103 may be provided for assuring positive conforming pressure contact between the surface 87*a* of the tape and the surface 95*a* of the drum. The belt 101 may be driven by pulley 102 or 103 in slipping relation to base 86 of magnetic record member 85 to give an ironing action for smoothing out wrinkles and blisters. In other words, the belt 101 may be driven at a greater surface speed than the surface speed of the base 86. Suitable examples of tapes and solvents were given in connection with the description of FIGURE 1.

Where softening of the coating depends on solvent action as in the embodiment of FIGURE 4, it is desirable that the backing 86 be of such material that it absorbs and/or releases the solvents through the backing, since the surfacing roll 95 is impervious to such solvent release.

An embodiment such as shown in FIGURE 3 or FIGURE 4 where no special heating is used, is also advantageous if the setting action of the coating is chemical in nature as with epoxy resins and does not depend on solvent release. The smoothing structures of FIGURES 3 and 4 are also advantageous where thermosetting resin coating material is applied to the base of a magnetic record tape, heat being applied to set the resin before it leaves the roll 70 or 95. Thermoplastic resins can be liquified by heat at the point where mobility is required, for example near the orienting magnet 75 in FIGURE 3 and set by cooling before stripping from the roll. The apparatus of FIGURE 1 or 2 is suitable for thermoplastic coatings as previously described.

It will be apparent that many modifications and variations may be effected without departing from the scope of the novel concepts of the present invention.

I claim as my invention:

1. The method of orienting magnetizable elements in a record medium which comprises bringing successive portions of the active surface of the record medium into contact with a non-magnetic curved surface moving with the same velocity as the active surface of the medium while the elements are in a movable state, and applying a magnetic field to the active surface of the record medium while the same is in curved conforming relation to said curved surface.

2. A magnetic record medium comprising a member having an active surface with magnetizable elements adjacent thereto whose predominant orientation is defined by curved lines which are concave with respect to said active surface.

3. The method of forming a magnetic record tape which comprises continuously applying an active layer of magnetizable material suspended in a fluid binder to an elongated tape base, continuously moving the active layer of magnetizable material while still in a fluid condition into conforming contact with a smoothing surface substantially smoother than the surface of the active layer and moving at the same speed as the active layer, pressing the newly formed active layer into conforming contact with the smoothing surface to substantially increase the smoothness of the surface of said active layer, and applying a magnetic field to the active layer while it travels in contact with said smoothing surface from a magnetic field source at the side of the smoothing surface opposite the side receiving said active layer to attract the magnetizable particles of the active layer toward said smoothing surface and thereby concentrate and compact the magnetizable particles at the active surface of the resulting magnetic record tape.

References Cited in the file of this patent

UNITED STATES PATENTS

| | | |
|---|---|---|
| Re. 23,637 | Montgomery | Mar. 24, 1953 |
| 2,418,479 | Pratt et al. | Apr. 8, 1947 |
| 2,688,567 | Franck | Sept. 7, 1954 |
| 2,691,072 | Mathes | Oct. 5, 1954 |
| 2,711,901 | Von Behren | June 28, 1955 |
| 2,714,133 | Bany | July 26, 1955 |
| 2,796,359 | Speed | June 18, 1957 |

FOREIGN PATENTS

| | | |
|---|---|---|
| 759,486 | Great Britain | Oct. 17, 1956 |